Patented Apr. 9, 1940

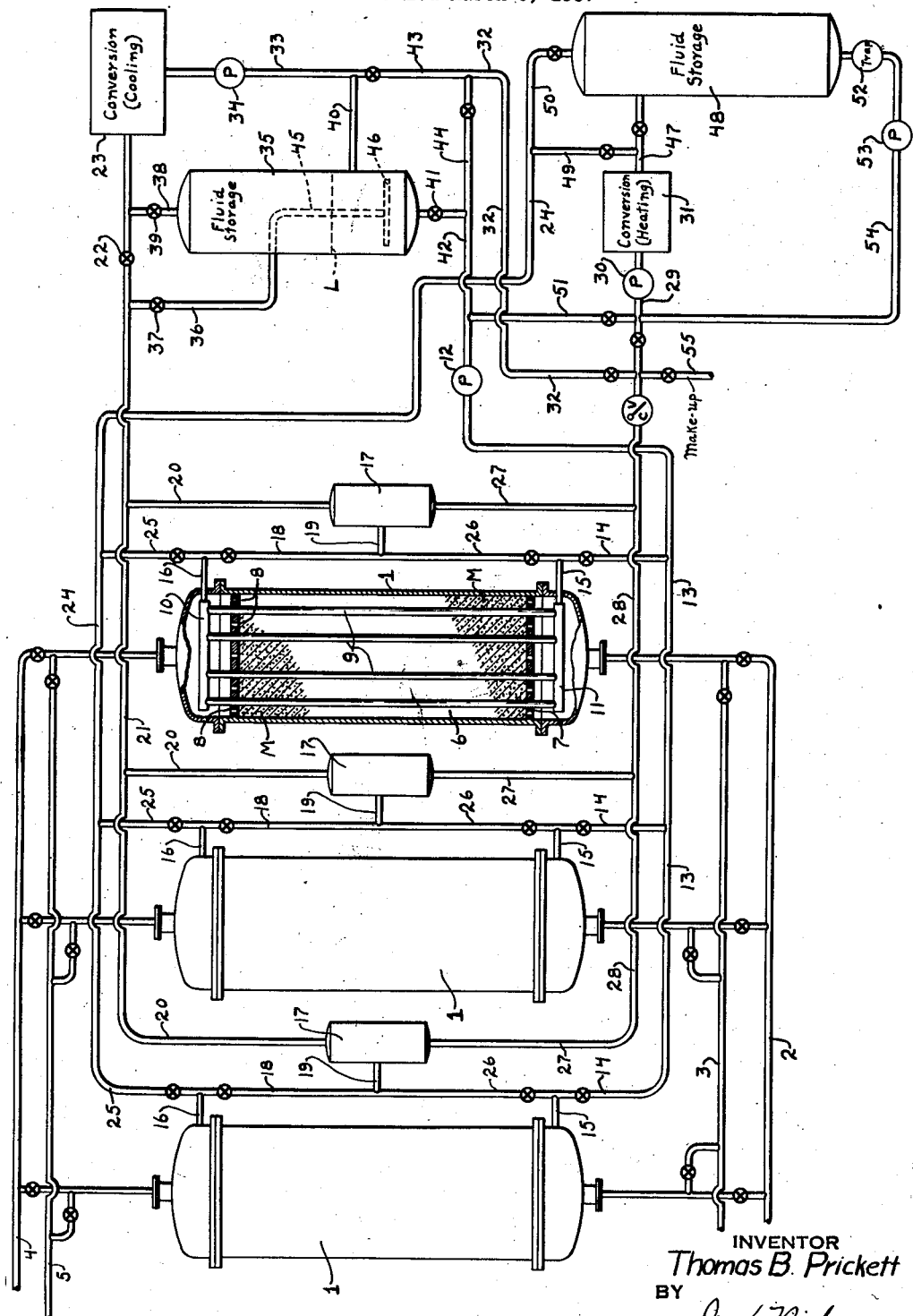

2,196,229

UNITED STATES PATENT OFFICE 2,196,229

HEAT EXCHANGE SYSTEM

Thomas B. Prickett, Woodbury, N. J., assignor to Houdry Process Corporation, Wilmington, Del., a corporation of Delaware Application March 3, 1937, Serial No. 128,742

12 Claims. (Cl. 23—288)

The present invention relates to the temperature control of reaction zones in which endothermic and/or exothermic reactions are effected. The zone may or may not contain a contact mass which promotes, enters into, or in any way assists the reaction. More particularly, the invention is concerned with the passage of a stream of heating or cooling fluid in heat exchange relation with the reaction zone, as a result of which, such fluid is subject to change of state. It is directed particularly toward circuits for handling heat exchange fluid utilized in controlling the temperature of reaction zones wherein the rate or intensity of reaction fluctuates.

Endothermic or exothermic chemical reactions are subject to momentary or progressive changes, often of considerable magnitude, in velocity, completeness or intensity with changes in operating conditions, including concentration of reactants, space velocity, pressure, and condition of any contact mass that may be disposed in the reaction zone. When a contact mass promotes or assists a reaction in which a by-product is deposited as a contaminant on or in the mass, the mass in many instances progressively loses activity and therefore causes progressive change in the intensity of the reaction during the course of a reaction period. Likewise, during regeneration of such a mass, as by oxidation or combustion, when the deposit or contaminant is of a burnable nature, the rate of heat evolution decreases with decreasing concentration and changes in the combustibility of such deposit.

A stream of heat exchange fluid, which is utilized to control the temperature of the reaction zone and which is subject to change of state as a result of such temperature control, i. e., is condensed while supplying heat of reaction and vaporized during or succeeding absorption of heat of reaction, changes its state at rates which fluctuate directly with the variations in the amount of heat absorption or evolution incidental to changes in the reaction. Thus, one or more conversion zones included in the circuit for heat exchange fluid for the purpose of converting such fluid to its original state prior to returning it in heat exchange relation with the reaction zone and/or for recovering the energy involved in effecting the conversion are often required to convert material which is supplied at widely varying rates. The equipment used in the conversion zones usually can be designed to operate efficiently under only a single load or relatively narrow range of loads and functions inefficiently or is inadequate when the load changes appreciably. When the conversion involves recovery and utilization of the energy incidental to the change of state, any substantial variation in the rate of energy recovery causes serious upsets in the procedure and economies of plant operation.

One object of the present invention is to provide a circuit for heat exchange fluid capable of operating efficiently under widely varying load conditions. Another object is to provide for flexibility of operation while maintaining a high degree of efficiency and economy. Another object is to effect recovery of the energy incidental to conversion of the heat exchange fluid at substantially constant rates. Other objects will be apparent from the detailed discussion which follows.

The invention involves the use of one or more storage zones interposed in circuit between the heat exchange and conversion zones. When the conversion zone is effecting condensation of the heat exchange fluid the storage zone receives the vapor from and discharges vapor into the stream of fluid entering the conversion zone as required to provide substantially constant flow of that stream despite fluctuations in the rate of change of state in the fluid in the heat exchange zone; when the conversion zone is vaporizing the heat exchange fluid a storage zone may receive vapors from the stream thereof leaving the conversion zone during the periods of depressed intensity of endothermic reaction in the reaction zone and return such vapor to the stream during the periods when the reaction is accelerated or more intense, thereby to provide substantially constant flow of fluid through the vaporizing zone.

For illustration, one concrete embodiment of the invention is shown in the somewhat diagrammatic flow chart comprising the single view of the accompanying drawing.

In the form of the invention indicated in the drawing, a plurality of converters 1, of which one is shown in section, are arranged for use in alternate periods of endothermic and exothermic reaction. They are selectively connected to a supply line 2 for reactants for the endothermic reaction, for example, fluid hydrocarbons to be treated or converted, and to a supply line 3 for reactants for the exothermic reaction, such, for example, as a regenerating medium comprising air or other oxygen-bearing fluid, and to reaction product lines 4 and 5 for endothermic and exothermic reaction products, respectively. A plurality of converters are utilized (three being shown) so that one or more may be in endothermic reaction, while one or any desired number may be in exothermic reaction, thereby to provide for continuous flow of endothermic and/or exothermic reactants to the battery of converters. As indicated by the converter shown in section, each converter has a reaction chamber or zone 6 limited by perforated partitions 7 and 8 and containing a suitable contact mass M. Heat exchange means associated with each reaction zone and adapted to conduct heating or cooling fluid therethrough may comprise a plurality of conduits or coils 9 extending between manifolds 10 and 11. When a contact mass such as M is utilized in the reaction chamber, the conduits or coils 9 extend through and are embedded in the mass.

During the exothermic reaction period of one of said converters a suitable heat exchange liquid, such as water, mercury, diphenyl, salt solution, and the like, is forced by pump 12 under suitable pressure through supply manifold 13, thence through proper valved branch lines 14 and 15 and through the reaction zone wherein the liquid absorbs heat of reaction. The fluid then emerges from the zone of heat exchange by line 16 and is conducted by valved line 18 and connecting branch 19 to a separating zone containing separator 17. The stream of heat exchange fluid may be partially or substantially completely vaporized in conduits 9, or the heat exchange liquid may be forced through conduits 9 under such conditions of temperature, rate and pressure that substantially no vaporization takes place in the heat exchange zone. When it is desired to avoid vaporization in the heat exchange zone vapors may be produced by reducing the pressure of the stream of fluid before such stream enters separator 17, as by manipulation of the valve in line 18. In either case the vapors resulting from absorption of heat by the stream of fluid are discharged from vessel 17 by vapor line 20 into vapor main or manifold 21, which is provided with valve 22 and leads to a conversion or cooling zone 23 containing any suitable equipment arranged and adapted for producing condensate from the vapor and/or for recovering the energy contained therein, such, for example, as one or more heat exchangers.

During the endothermic reaction periods the heat exchange fluid, usually in vapor phase, is sent at suitable temperature and pressure, by manifold 24 through valved branch line 25 into and through the reaction zone wherein it is partially condensed in supplying heat to the reaction. The resulting fluid, usually a mixture of liquid and sufficient excess vapor to maintain the required or desired pressure in heat exchangers 9, is then conducted to separator 17 through line 15 and valved branch 26. The remaining vapor fraction is usually constant or substantially constant in amount, since the volume of the condensate produced at any given instant in heat exchangers 9, is, in most instances, small as compared to the volume of vapors required to maintain substantially constant pressure. These vapors are then led to conversion zone 23 alone or with any vapor flowing in line 21. When a battery of converters is operated alternately in endothermic and exothermic periods of reaction, and a heat exchange fluid is utilized during each period, the pressure of vapors which supply endothermic heat of reaction is often different from the pressure of vapors resulting from absorption of heat of reaction; consequently, it is usually desirable to adjust the pressure of one or both of the vapor streams at or before the point of their combination, for example before their admission to separator 17, as by the aforesaid adjustment of the valve in line 18 and/or suitable adjustment of the valve in line 26.

The condensate or liquid from each separator 17 is conducted by line 27 to manifold or main line 28, from which such liquid is passed through line 29 to be forced by pump 30 into conversion zone 31 for revaporization and an adjustment of the temperature thereof, prior to returning it to an endothermic reaction zone. If needed to control an exothermic reaction the liquid is sent through line 32, to be added to condensate forced from conversion zone 23 by pump 34 located in line 33 to provide feed for pump 12. Line 29 preferably follows or contains a barometric leg or other suitable device such as the check valve indicated for preventing return of liquid to separator 17.

When a contant mass such as M is used to promote reactions which deposit poisoning material on the mass, the intensity or completeness of the reaction and, consequently, the amount of heat involved or absorbed per unit of time on-stream drops from a maximum at the benginning of the reaction period to a minmum at the end of the same. When the reaction is endothermic and involves the transformation of higher boiling hydrocarbons into lower boiling hydrocarbons, for example at about 850° F. and with the aid of a siliceous catalyst, the rate of condensate production from a vaporous heat exchange medium passed through tubes 9 will fall during the reaction period. The changing rate of condensation tends to cause decreases in the pressure of the vapors in the heat exchange zone. In the succeeding regeneration period for removing coky deposits from the catalyst by combustion, which may be conducted at a temperature of the order of 1000° F. or higher, cooling liquid introduced into the heat exchange zone vaporizes at rates which are proportional to the rate of heat production in the reaction zone. Those rates are highest when the regeneration period is just starting and the contact mass contains the highest concentration of solid deposit, or, in some instances, a residue of fluid reactants and/or reaction products from the on-stream reaction period. Such rates fall with decreasing concentration of burnable deposit on the contact mass. The changing rates in vapor production also tend to cause varying pressures in the heat exchange zone.

When a battery of converters is engaged in alternate endothermic and exothermic periods of reaction in the above indicated transformation of hydrocarbons and in regeneration of the contact mass in place, the stream of hydrocarbon reactants is shifted from one converter to another at predetermined intervals, say each fifteen minutes, so that the alternate periods of regeneration are about twice as long, or thirty minutes. A stream of cooling fluid may be utilized for only a portion of the regenerating period, for example from ten to twenty minutes, thus providing intermittent or overlapping cooling periods, which, in addition to the changing rates or intensities of reaction indicated above, cause changes in the rate of flow of vapors and liquid in lines 21 and 28, respectively, and tendencies toward periodic or progressive changes in the pressures in each of the heat exchange zones.

According to the invention, a fluid storage zone is provided containing storage vessel 35 of suitable capacity connected to the heat exchange zones and conversion zone 23. Vessel 35 is provided with a vapor inlet line 36 containing valve 37 and a vapor outlet line 38 having valve 39 therein, which lines are connected to vapor line 21 on opposite sides of valve 22. Valves 22, 37 and 39 are manipulated cooperatively so as to admit vapor to conversion zone 23 at substantially constant rate, which is approximately the mean or average rate at which vapors issue from the heat exchange zones and separators 17, the rate of vapor flow from the system in most instances depending largely, if not substantially completely, upon the intensity of exothermic reaction within the system. When the amounts of vapor traversing line 21 are above the average rate of production for the system, valve 22 is partially closed, valve 37 is opened, and valve 39 closed so that the excess vapor enters vessel 35 and is stored therein until the flow of vapor through line 21 drops below normal, at which time valve 39 is opened and proper adjustments of valves 22 and 37 are made to permit such vapor to leave vessel 35 at the required rate to insure maintenance of substantially constant flow to conversion zone 23 at all times. Although valves 22, 37 and 39 may be manually operated in response to changes of pressure and rate of flow of fluid in line 21, a smoother and better control of flow to conversion zone 23 is realized when these valves are mechanically operated in known manner in direct response to indicated changes of flow rate and/or pressure in line 21 as by the use of motor controls electrically or hydraulically connected to suitable pressure and/or rate indicating means located in that line.

Preferably storage vessel 35 also provides storage space for heat exchange liquid which leaves the heat exchange zone or zones in either or both heating and cooling circuits and/or for liquid issuing from conversion zone 23, in order to provide uniformity of operation in the heat exchange system. To this end, all or any desired portion of the liquid in line 28 may be conducted through lines 32 and 43 and admitted to vessel 35 by line 40, together with the liquid leaving conversion zone 23 by line 33, or, a portion of the liquid leaving the heat exchange and/or conversion zones may by-pass vessel 35 through valved line 44. Liquid stored in vessel 35 may be withdrawn therefrom by line 41 into line 42, as required to provide the desired amount of feed for operation of pump 12 and/or of conversion zone 31. It is usually desirable to discharge vapors into storage zone 35 below any liquid level maintained therein, as indicated at L. This may be done by utilizing line 45 and transverse perforated branch 46, which are extensions of line 36.

When the heat exchange system is supplying endothermic heat of reaction, that portion of the stream of vapor leaving the conversion zone 31 by line 47 which is in excess of that amount of vapor required by the heat exchange zone or zones during periods when the intensity of reaction is below average or normal may be received by and stored in storage vessel 48, while the vapor required in the heat exchange zone or zones may be carried to line 24 by valved line 49. During the periods of maximum or above normal activity in the reaction zone, vapor stored in vessel 48 may be discharged from the latter by valved line 50 to augment the vapor in line 49, in response to decreases of pressure in the heat exchange system caused by increasing rates of condensation. Thus a substantially constant rate of feed to conversion zone 31 may be maintained at all times, such feed being derived directly from line 28, or, when the amount of condensate in that line is insufficient, it may be augmented by conducting liquid from connecting line 42 to line 29 through valved branch 51. Any condensate that is produced by heat losses from vessel 48 may be removed from the latter by line 54 containing trap 52 and pump 53 and returned to line 29.

In some instances, as when process steam is required for other plant purposes, and where water or steam is the heat exchange fluid utilized for controlling the temperature of a reaction zone such as 6, steam may be removed from the heat exchange circuit between storage vessel 35 and conversion zone 23 by a suitable connection (not shown). In such instances, and to provide heat exchange fluid which may be lost to the system by leakage, the proper fluid may be admitted to the system as by valved line 55.

It is to be understood that the invention is not restricted to any particular reaction or specific structure of converters or heat exchange zones. One form of converter and heat exchange zone has been shown for the purpose of illustrating the invention. Other suitable forms or types will be known to those skilled in the art and may include the converters described in U. S. Patent No. 1,987,904 and U. S. Patent No. 2,042,468, each issued to Eugene J. Houdry; other types of heat exchange means are disclosed in the copending application of Eugene J. Houdry and Raymond C. Lassiat, Serial No. 728,544, filed June 1, 1934 (Patent No. 2,078,947, issued May 4, 1937). Other chemical processes to which the invention is applicable include catalytic oxidation, reduction or hydrogenation of hydrocarbons and their derivatives, polymerization of unsaturated hydrocarbons, purification of gases, synthesis of ammonia, and the like.

It is apparent from the above that the present invention provides a heat exchange system capable of operating smoothly and efficiently despite wide variations in momentary or periodic demands for heating or cooling capacity. It also provides for economical conversion of the heat exchange fluid where a closed circuit for the same is utilized and/or for recovery of the energy incidental to the conversion at substantially constant rates without unnecessary wastage of such energy.

I claim as my invention:

1. In controlling the temperature of chemical reactions of changing intensity, involving continuous passage of a stream of temperature control fluid in heat exchange relation with a reaction zone to impart heat to or remove heat from the latter, a portion of the stream as a result being subject to change of state at rates which change with reaction intensity the process steps comprising dividing the stream of fluid resulting from said heat exchange into a vapor fraction and a liquid fraction, condensing said vapor fraction in a conversion zone, sending vapor into said conversion zone at substantially constant rate, during periods of above normal volume of said vapor sending a portion thereof to storage and during periods of reduced volume of vapor releasing stored vapor to the stream entering said conversion zone thereby to maintain said substantially constant flow to the latter, combining the stream of condensate issuing from said conversion zone with said liquid fraction, returning the combined fluid into heat exchange relation with a reaction zone, and storing liquid in the heat exchange circuit and returning stored liquid to the stream returning to a reaction zone in response to changes in reaction intensity to continuously meet the requirement of that zone for heat exchange liquid and to provide substantially unvarying operation of equipment, including conversion zones and pumps necessary to the heat exchange circuit, despite substantial changes in reaction intensity and in the rate of change of state of the temperature control fluid.

2. In the temperature control of exothermic reactions which change in intensity above and below an average intensity involving the passage of temperature control liquid in heat exchange relation with the reaction zone to remove heat from the latter, as a result of which the liquid produces vapor at rates which vary with changes in reaction intensity to yield a mixture of liquid and vapor in changing amounts, said vapors being subsequently condensed in a conversion zone, the process steps comprising separating unvaporized liquid from said mixture of vapor and liquid, continuously sending a stream of vapor so separated to said conversion zone at substantially constant rate, during periods of above average reaction intensity removing a portion of said vapor from said stream and storing same, during periods of reduced reaction intensity releasing vapor from storage and returning the released vapor to said stream, and controlling diversion of vapor into storage and return of stored vapor to said stream in response to reaction changes to maintain said substantially constant rate of vapor delivery to said conversion zone at all times.

3. In the control of endothermic reactions of changing intensity effected in the presence of a contact mass involving use of vapor to supply heat to the reaction whereby a portion of the vapor is condensed at rates which vary with changes in reaction intensity, the process steps comprising feeding heat exchange liquid at substantially constant rate to a vaporizing zone, sending a continuous stream of the vapor issuing from said zone into heat exchange relation with said contact mass, during periods of below normal reaction intensity removing part of said vapor from said stream and storing said part, during periods of increased reaction intensity releasing stored vapor and returning the same to said stream, dividing the stream of fluid of mixed phase issuing from the heat exchange zone into a vapor fraction and a liquid fraction, feeding said vapor fraction at substantially constant rate to a condensing zone, adding condensate issuing from the latter to said liquid fraction to form the charge to said vaporizing zone, during periods of above normal reaction intensity diverting a portion of said charge to storage, releasing stored charge during periods of reduced reaction intensity, and controlling storage and release of vapor and charge, respectively, in response to changes in reaction intensity to maintain at all times said substantially constant feed rate to said vaporizing zone while simultaneously meeting changing demand for vapor in the heat exchange zone.

4. In controlling the temperature of exothermic reactions of changing intensity involving the continuous passage of temperature control liquid in heat exchange relation with the reaction zone to absorb heat therefrom as a result of which the liquid is converted partly into vapor at rates which vary with changes in reaction intensity, said vapor being subsequently condensed in a conversion zone, the process steps comprising continuously dividing the fluid which has absorbed heat from the reaction zone into a vapor fraction and an unvaporized liquid fraction, continuously feeding a stream of said vapor fraction to said conversion zone, during periods of above average reaction intensity removing a portion of said vapor fraction from said stream and directing said portion to storage, during periods of reduced reaction intensity releasing vapor from storage and returning the released vapor to said stream, so controlling removal of vapor from and return of vapor to said stream in response to changes in reaction intensity that vapor is fed to said conversion zone at substantially constant rate, continuously removing condensate from said conversion zone, adding said liquid fraction to said condensate returning a stream of the combined liquids into heat exchange relation with said reaction zone at substantially constant rate, and diverting excess liquid from said last named stream to storage and returning stored liquid to that stream in response to changes in volume of said liquid fraction, thereby to maintain said substantially constant flow of vapor to said conversion zone and of liquid to said reaction zones, respectively.

5. In controlling the temperature of a contact mass during regeneration by combustion to remove burnable deposits therefrom and involving the passage in heat exchange relation with the mass of a stream of temperature control liquid which is subject to vaporization upon absorption of heat of the regenerating reactions at rates which change progressively from above to below an average rate with progressive changes in the intensity of the combustion reactions, said vapor being thereafter condensed in a heat recovery zone, the process steps comprising separating unvaporized liquid from vapor produced in said heat exchange step, sending a continuous stream of the separated vapor to said heat recovery zone at substantially constant rate, during the first portions of the regeneration when combustion is more intense removing part of said vapors from said stream and storing the same, during later portions of the regeneration when the combustion is less intense releasing vapor from storage and returning the released vapor to said vapor stream, so controlling diversion of vapor from said stream into storage and the later return of stored vapor to said stream in response to the progressive changes in intensity of the regeneration as to maintain said substantially constant flow of vapor to said heat recovery zone equivalent to approximately the average rate of production of vapor in said heat exchange fluid for the entire regenerating period, removing condensate from said heat recovery zone, and continuously returning said condensate and said unvaporized liquid into heat exchange relation with said contact mass.

6. In controlling reaction temperature in a battery of converters providing reaction zones, in at least one of which zones exothermic reaction is effected while in another zone endothermic reaction is simultaneously taking place, involving continuous and simultaneous passage of temperature control fluid in heat exchange relation with each of said zones to supply endothermic heat of reaction to one and to remove exothermic heat of reaction from the other of said zones, said fluid as a result being subject to change of state at rates which change with reaction intensity in each of the endothermic and exothermic reaction zones, the process steps comprising dividing said fluid issuing from said converters into a liquid fraction and a vapor fraction, converting said vapor fraction to liquid at substantially constant rate in a condensing zone, periodically diverting excess vapor to storage from the stream entering said condensing zone and at other periods releasing stored vapor from said zone to said stream in response to changes in exothermic reaction intensity to maintain substantially constant rate of vapor flow to said condensing zone, combining condensate issuing from said condensing zone with said liquid fraction, returning a portion of the combined liquids in heat exchange relation with said exothermic reaction zone, sending another portion of said liquid through a vaporizing zone at substantially constant rate, sending a stream of vapors so produced into heat exchange relation with said endothermic reaction zone at rates governed by and changing with changes in endothermic reaction intensity, and during periods of reduced endothermic reaction intensity diverting to storage a portion of said last named vapor stream, and releasing stored vapor to said last named stream during periods of increased endothermic reaction intensity.

7. In controlling the temperature of a battery of converters, each of which is used in alternate periods of endothermic transformation of hydrocarbons in the presence of a contact mass and of regeneration of said mass in place by combustion of burnable deposits made thereon during said transformation periods, said battery being arranged and adapted for transformation of a continuous stream of hydrocarbons by shifting the flow of hydrocarbon starting material from one converter to another after a transformation period so that at least one converter in the battery is always in endothermic reaction and one or more converters in exothermic reaction or regeneration, involving the passage of a stream of temperature control fluid in heat exchange relation with the contact mass in each of said converters through interdependent and interconnected circuits, said fluid being utilized in vapor phase to supply heat of endothermic reaction, in liquid phase to absorb heat of exothermic reaction, and, as a result, being subject to change of state at rates which vary with changes in the respective reaction intensities, vapor remaining after such heat exchange being condensed in a heat recovery zone, condensate so produced being returned in heat exchange relation with a contact mass in exothermic reaction, and liquid remaining after such heat exchange being converted to vapor in a vaporizing zone and being returned in heat exchange relation with a contact mass in endothermic reaction, the process steps comprising, continuously dividing heat exchange fluid issuing from the battery of converters into a liquid fraction and a vapor fraction, continuously feeding a stream of the latter to said heat recovery zone, during periods of above normal vapor production removing vapor from said stream and storing the same, during periods of below normal vapor production releasing vapor from storage and returning the released vapor to said vapor stream, so controlling direction of vapor to storage and release of vapor therefrom in response to changes in vapor production as to maintain substantially constant flow of vapor to said heat recovery zone at all times, removing condensate from said heat recovery zone, continuously feeding a stream of liquid comprising condensate and the aforesaid liquid fraction to said vaporizing zone at substantially constant rate, during periods of above normal liquid production removing a part of said liquid stream and storing said part, during periods of below normal production of liquid releasing stored liquid and returning the released liquid to said liquid stream, and so controlling diversion of liquid to storage and return of stored liquid to the stream entering said vaporizing zone in response to changes in liquid production in the heat exchange circuits that said substantially constant rate of flow to said vaporizing zone is maintained at all times.

8. In apparatus for effecting endothermic chemical reactions, in combination, a converter providing a reaction chamber containing a contact mass, heat exchange means associated with the latter, a separator connected to said heat exchange means, said separator being provided with outlets for vapors and liquids respectively, condensing means connected to said vapor outlet, conversion means for vaporising heat exchange liquid, lines for conducting condensate from said liquid outlet and said condensing means to said conversion means, a vapor line connecting the latter and said heat exchange means, a storage vessel for vapor, valved inlet and outlet lines connecting said vessel with said vapor line, and storage means associated with said lines for condensate, thereby to provide a heat exchange system wherein constant flow of liquid to the conversion means may be maintained at all times while simultaneously meeting changing demand for vapor in said heat exchange means responsive to changes in reaction intensity.

9. In apparatus for effecting exothermic chemical reactions, a converter providing a reaction chamber containing a contact mass, a closed circuit for conducting a temperature control fluid in heat exchange relation with the contact mass comprising heat exchange means associated with the latter for receiving liquid and vaporizing a portion thereof, a separator connected to said heat exchange means for receiving fluid from the latter and dividing said fluid into a vapor fraction and a liquid fraction, condensing means, a line for conducting vapor directly from said separator to said condensing means, and connections for conducting condensate from said condensing means and liquid from said separating means to said heat exchange means, a storage vessel, a valved connection between said vapor line and said storage vessel for conducting vapor to the latter from said vapor line during periods of above normal vapor production in said separator, a second valved connection between said storage vessel and said vapor line for releasing stored vapor and returning the same to said vapor line during periods of below normal vapor production in said separator, thereby to provide for substantially constant flow of vapor to said condensing means at all times.

10. In apparatus for controlling exothermic chemical reactions, in combination, a converter providing a reaction chamber containing a contact mass, a closed heat exchange circuit, said circuit comprising a heat exchanger associated with said mass, a liquid-vapor separator connected to said heat exchanger, condensing means, a valved line directly connecting said liquid-vapor separator with said condensing means, conduits including pumping means connecting said condensing means and said separator with said heat exchange means, a storage vessel, valved connections between said storage vessel and said valved line, one of said connections joining said valved line at a point between the valve therein and said separator, the other of said connections joining said valved line at a point between said valve and said condensing means, whereby heat exchange liquid supplied to said heat exchange means is divided into liquid and vapor fractions, the vapor is condensed and returned into heat exchange relation with the contact mass while substantially constant flow of vapor to the condenser and the demand for heat exchange liquid in said heat exchange means are supplied at all times despite changes in intensity of exothermic reactions effected in said reaction chamber.

11. In apparatus for effecting exothermic chemical reactions, a converter providing a reaction chamber containing a contact mass, heat exchange means in said chamber for conducting a cooling fluid in heat exchange relation with said mass, a separator for receiving and dividing the fluid into liquid and vapor fractions connected to said heat exchange means, a cooler for condensing said vapor fraction, a vapor line directly connecting said separator and said cooler, a valve in said line, a fluid storage vessel provided with inlet and outlet vapor connections, a valved line connecting said inlet connection and a point on said first named vapor line between said valve and said separator, a second valved line connecting said outlet connection and a point in said vapor line between said valve and said cooler, said storage vessel thereby being connected to said vapor line so as to receive and store vapor during periods of above normal vapor production in said separator and release vapor to said vapor line during periods of below normal vapor production and permit a substantially constant flow of vapor from said separator directly to said cooler, lines for conducting condensate from said cooler and liquid issuing from said separator to said storage vessel, and a line for conducting liquid from the latter to said heat exchange means.

12. In apparatus for effecting chemical reactions, in combination, a battery of converters, each providing a reaction chamber for containing a contact mass and being arranged and adapted for alternately conducting endothermic and exothermic reactions, interdependent and interconnected circuits for conducting temperature control fluid in heat exchange relation with said reaction chambers to supply endothermic and remove exothermic heat of reaction, said circuits comprising heat exchange means associated with each of said chambers, a heater for vaporizing liquid, means including valved conduits for selectively conducting vapor from said heater to each of said heat exchange means, a vapor storage vessel adapted and arranged periodically to receive vapor from said conduits and at other periods to release stored vapor thereto, valved lines for selectively supplying heat exchange liquid to each of said heat exchange means, liquid-vapor separating means for receiving temperature control fluid from said heat exchange means and connected to each of the latter, a condenser, a vapor line connecting said condenser and said separating means, conduit connections for conducting liquid from said separating means and from said condenser to both said heater and said valved lines, and a fluid storage receptacle connected to said vapor line and to said conduit connections for periodically receiving and storing vapor and liquid and at other periods releasing stored vapor to said vapor line and stored liquid to said conduit connections, thereby to provide for constant rate of feed of vapor to said condenser and of liquid to said heater at all times while simultaneously meeting demands for temperature control fluid in said heat exchange means despite changes in the intensities of both endothermic and exothermic reactions in said battery of converters.

THOMAS B. PRICKETT.